United States Patent [19]
Mann

[11] Patent Number: 6,019,287
[45] Date of Patent: Feb. 1, 2000

[54] SECURITY READER FOR AUTOMATIC DETECTION OF TAMPERING AND ALTERATION

[75] Inventor: Graeme R. Mann, Engadine, Australia

[73] Assignee: 3M Innovative Properties Company, St. Paul, Minn.

[21] Appl. No.: 08/624,584

[22] PCT Filed: Oct. 6, 1994

[86] PCT No.: PCT/US94/11359

§ 371 Date: Aug. 15, 1996

§ 102(e) Date: Aug. 15, 1996

[87] PCT Pub. No.: WO95/10097

PCT Pub. Date: Apr. 13, 1995

[30] Foreign Application Priority Data

Oct. 6, 1993 [AU] Australia ............................... PM1661

[51] Int. Cl.⁷ .................................................. G06K 7/10
[52] U.S. Cl. .......................................... 235/454; 235/488
[58] Field of Search .................................... 235/454, 488

[56] References Cited

U.S. PATENT DOCUMENTS

| | | | |
|---|---|---|---|
| 4,222,662 | 9/1980 | Kruegle | 355/40 |
| 4,684,795 | 8/1987 | Colgate, Jr. | 235/488 |
| 4,765,656 | 8/1988 | Becker et al. | 235/488 |

FOREIGN PATENT DOCUMENTS

| | | |
|---|---|---|
| 0 219 012 | 10/1986 | European Pat. Off. . |
| 2594982 | 2/1986 | France . |
| 2 212 445 | 7/1989 | United Kingdom . |

*Primary Examiner*—Harold I. Pitts
*Attorney, Agent, or Firm*—Peter L. Olson

[57] ABSTRACT

A document (10) is covered by a laminate (13) comprising a layer of microspheres (16) over an adhesive layer (14) covering a source image (12) such as a photograph, printed matter, or a bar code arranged on a substrate (11). Light impinging on the document (10) is split by the optical properties of the microspheres (16) and underlying specular reflectors. The remaining light passes through the microspheres (16), through the adhesive layer (14) and strikes the substrate (11) or source image (12) on the document (10), and is reflected (18) and scattered (20). Alternatively, the laminate (13) can comprise a plain or clear layer of polyester without microspheres over the adhesive layer (14). Light impinging on the laminate (13) passes through the polyester and laminate (14) to strike the substrate (11) or source image (12) where it is reflected and scattered. A first light source (24) directs light to the document (10). A second light source (26,27) directs light towards a beam splitting mirror (23) which reflects the light to the document (10).

23 Claims, 2 Drawing Sheets

SECURITY READER FOR AUTOMATIC DETECTION OF TAMPERING AND ALTERATION

TECHNICAL FIELD

The present invention relates generally to a system for recovering visual data from a document that has been covered by a security laminate, and then examining the integrity of the document to ensure that no tampering or alteration has occurred to either the document or the visual data contained thereon.

BACKGROUND

There is a wide variety of different types of documentation that contain information of a very important nature that, by itself, assigns legal title to, or possession of, such a document, or of an article to which that document relates. Examples of such documents are, but not limited to, passports, identity (I.D.) cards, land titles, share titles, etc. Ownership of such items is generally declared by a typed, printed, photographic, or handwritten inclusion on that item, detailing for example the owners name, address, signature, and so on.

Using commonly available technology it is possible to alter such typed, printed, photographed or handwritten details in such a way that the document can then show that ownership of that document, or an article to which that document relates, has been transferred to a party not legally entitled to that document or article.

The major concern here is that, although the document itself is a legal instrument in that it has not been forged, duplicated or simulated, and therefore this document will pass an appropriate security check, the details contained thereon have been altered and therefore give a false assignment of that legal document.

To impede the successful tampering or alteration of such details it is a known practice to apply a security laminate over the top of such details. Such laminates invariably contain security break indicators that will clearly reveal as to whether that laminate itself is genuine, whether that laminate has been lifted and replaced, whether that laminate's surface has been penetrated, and whether that laminate surface has been overprinted or overlabelled.

It is a further practice to add areas of printing or patterns which only respond to ultra-violet or infra-red excitation.

To examine a document thus protected with such a laminate or ultra-violet or infra-red markings, a special viewer is employed whereby an examiner or security official can observe the document by means of placing such document in that special viewer and applying differing light sources to reveal both the protected details and the integrity of the protective security laminate. The examination is carried out by an examiner or security official by physically signing the document in question and by making a valued judgment as to its contents and integrity.

There is a growing need to automate this process.

SUMMARY OF THE INVENTION

It is therefore an object of the present invention to provide an arrangement that substantially ameliorates the problems alluded to above.

Desirably, a device which can be controlled from computerized control equipment, which views through laminate and transfers an image of the protected details to the computerized control equipment for further processing, such as decoding, and then views the structure of the laminate itself and transfer its details to the computerized control equipment for further processing, such as examining this structure for irregularities, is provided.

Also provided is a hardware device which scans the images in both a "look through" and a "look at" mode and transfers corresponding images to an associated processing unit.

Apparatus configured in accordance with the present invention is able to view through the securing laminate to reveal details of the information contained thereunder, and then view the structure of the laminate in such a way as to show the areas on the security laminate which no longer conform to the original manufacturing specification, thus indicating possible forgery, tampering or alteration, and preferably to reveal the presence of other indicators such as may become visible through ultra-violet or infra-red excitation.

In accordance with one aspect of the present invention there is disclosed an arrangement for reading information from a first light transmissive layer and a second layer of an object, said arrangement comprising, in combination:

first light source means for directing (first) light at a first angle of incidence at the object;

second light source means for directing (second) light at a second angle of incidence, different to said first angle of incidence, at the object;

a light receiving device for receiving a reflection of said first light from said first layer, and a reflection of said second light from said second layer and to produce at least one image signal; and a processing device for processing said image signal to provide information regarding said layers.

Preferably, the first layer comprises a plurality of glass spheres or spheres of material having similar optical properties to glass, referred to herein as microspheres. Alternatively, the first layer comprises a clear material having similar optical properties to polyester.

Preferably, the first light means comprises one or more sources that are directed to said object by first being refracted from a two-way mirror, the light having been reflected by the first layer then returning again through the two-way mirror to the light receiving device. The first light illuminates preferably at multiple different intensities as controlled by the processing device.

Preferably, the processing device is a data processing unit such as a personal computer.

Preferably, the first and second light means are switchable so as to operate alternately or in unison, and of variable intensity. The first and second light means can be of different optical bandwidths. The light source means can also be within the visible spectrum, and/or in the ultra-violet band and/or in the infra-red band. The light produced can be polarized or unpolarized.

Preferably, the light receiving means is a video image receiver such as, for example, a charge coupled device.

Preferably, the first layer is a sheet of plastics material having said spheres of glass or the like applied thereto. Alternatively the first layer can be a sheet of clear or plain polyester or similarly functioning material.

Preferably, said second layer is a document located below the first layer such as for example the page of a passport.

Preferably, the angle of reflection of one light source relative to the position of the video image receiver is less than 1°. Alternatively, the angle of reflection of one light source relative to the position of the video image receiver is greater than 1°.

There is a second mode of use whereby a sighting is made directly down a beam of light whereupon the details are no longer seen but are replaced by an image of the physical structure of the laminate surface. Alternatively, in this second mode of operation the details are no longer seen but are replaced by the distorted image of the light source being "mirrored" by the surface of the polyester laminate.

In accordance with another aspect of the invention there is provided a frame into which the document or passport is positioned.

In accordance with another aspect of the invention there is provided a multiplicity of light sources wherein some light sources strike the surface of the document and reflect back to the viewing position at an angle greater than 1°.

In accordance with another aspect of the invention there are provided other light sources that strike the document and reflect back to the viewing position at an angle less than 1°.

In accordance with another aspect of the present invention there is provided means by which these light sources are operated from an attached controlling device such as, but not limited to, a personal computer.

The video imaging device or similar sensory array may be located at the view position and directed towards the surface of the document. Images detected by this device are provided with a means whereby said images can be passed onto an attached controlling device such as, but not limited to, a personal computer.

BRIEF DESCRIPTION OF THE DRAWINGS

A preferred embodiment of the present invention will now be described, by way of example, with reference to the accompanying drawings, in which.

These figures, which are idealized, are not to scale and are intended to be merely illustrative and non-limiting.

DETAILED DESCRIPTION OF THE DRAWINGS

Figure 1:
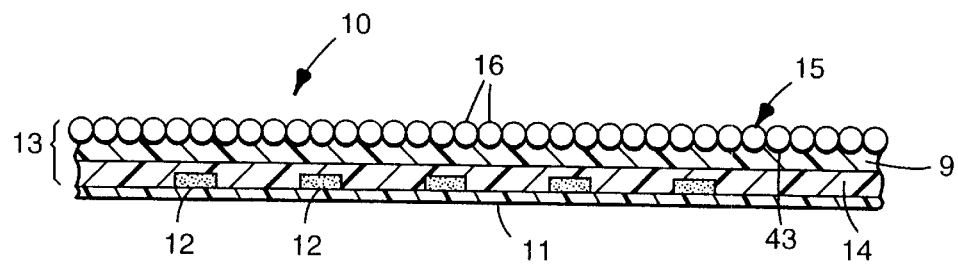
FIG. 1 is a schematic cross-section of a typical document over which has been fixed a retroreflective security laminate.

FIG. 1 illustrates a cross-section of the "secured" document 10 having a document substrate 11, with added typing, printing, bar code, photo, or handwriting collectively known herein as a source image 12. The source image 12 is shown in exaggerated size, for the purpose of clarity, and is covered by a composite layer of a security laminate 13. The laminate 13 comprises a retroreflective layer 15 that is made up of a monolayer of microspheres 16, typically formed by glass, an underlying partially-light-transmissive reflective layer 43, typically binder layer 9, and an adhesive layer 14. An example of a suitable laminate 13 is disclosed in Australian Patent No. 462,214 (Sevelin) which corresponds to U.S. Pat. No. 3,801,183. Minnesota Mining and Manufacturing Company's CONFIRM Brand Security Laminates are examples of commercially available laminates suitable for use in the preferred embodiment.

Figure 2:
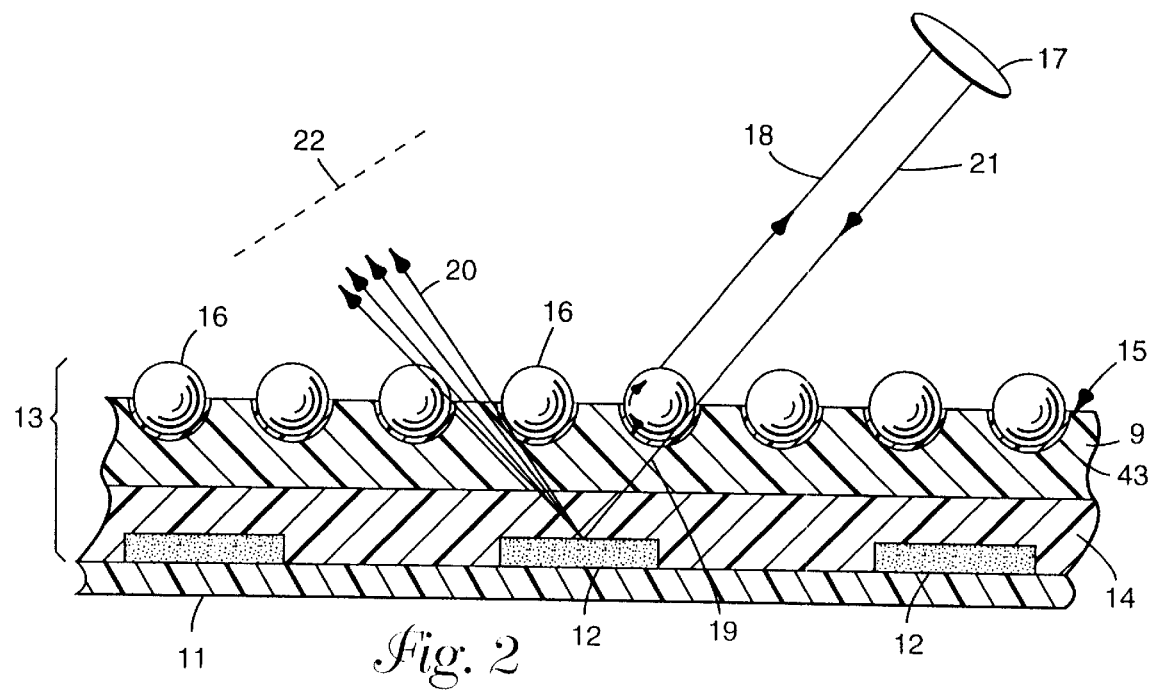
FIG. 2 schematically illustrates the optical properties of the security laminate of FIG. 1.

FIG. 2 illustrates the optical characteristics of the monolayer 15 of microspheres 16. A light source 17 emits a beam of light 21 that travels towards or is incident upon the laminate 13. In this illustration, the beam of light 21 enters one of the microspheres 16 and is split, with one portion 18 being retroreflected back toward the light source 17 and one portion 19 being transmitted so as to reach the substrate 11 or source image 12, as illustrated. The splitting of light beam 21 is a result of the optical properties of microspheres 16 and underlying reflective layer 43 which includes specular reflectors which are sometimes referred to as being "partially-light-transmissive".

The transmitted light portion 19, passes through the microsphere 16, through the reflective layer 43 and the adhesive layer 14 and strikes the substrate 11, which is opaque, or the source image 12 of the document 10. From there, the light beam is reflected and scattered to produce a number of beams 20.

In can be noted from FIG. 2 that the portion of the light beam 21 that is returned to the source 18 along the light path 18 can be said to be returning from the microsphere 16, at an angle less than 1° and thereby substantially parallel, if the position of the source 17 is also considered to be a viewing position.

It is further noted that whilst FIG. 2 illustrates the optics of a single microsphere 16, all microspheres within the laminate 15 give a corresponding response.

However, if a position 22 is considered to be the viewing position relative to the light source 17, then it can be said that the beams 20 are reflecting at an angle greater than 1° from the surface of the document 10, even though these beams 20, in fact, penetrate the retroreflective layer 15, and reflect from the substrate 11 and source image 12.

Not illustrated in FIGS. 1 or 2, the laminate can alternatively comprise a polyester laminate, known to be used for document security and which comprises a polyester layer, and an adhesive layer corresponding to the adhesive layer 14. The polyester layer has the property that, whilst being transparent to ordinary diffuse light, it is also substantially specularly reflective of light incident at angles substantially normal to the film.

Figure 3:
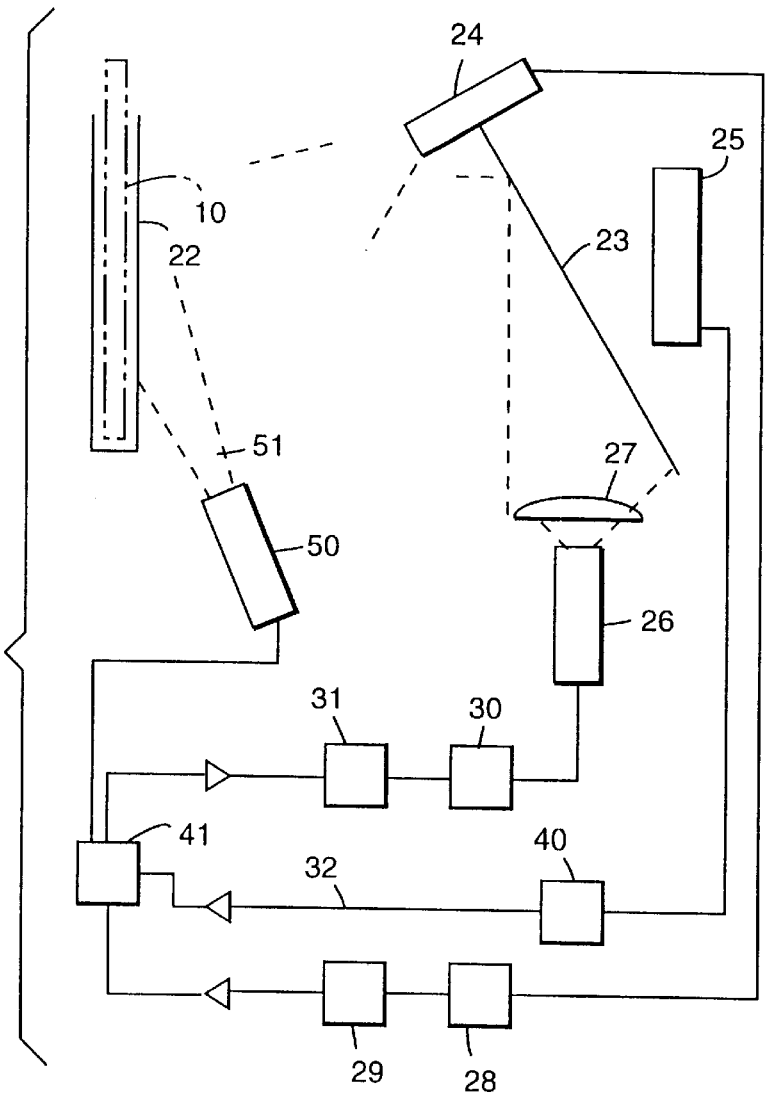
FIG. 3 schematically illustrates an optics arrangement of the preferred embodiment.

FIG. 3 illustrates an arrangement of one preferred embodiment of a system that comprises two light sources and one viewing position. An alternative configuration of a single light source and two viewing positions can be used. However the "optical" characteristics of both systems are identical.

A view frame 22 is provided that accurately locates the document 10 to be viewed.

A second light source 24 is provided which is arranged to be at an angle relative to a viewing position 25, of greater than 1°. The light source 24 is controlled by power source 28 and trigger source 29 which in turn is controlled by an attached personal computer 41 or equivalent computerized controller. In other embodiments, multiple ones of the first light source 24 can be used.

A first light source 26 is focused by a lens 27 onto a beam splitting (two way) mirror 23. The turning properties of mirror 23 produce a light source which appears to a viewing position 25 as being returned from the surface of the document 10 at an angle of less than 1°.

Arranged at the viewing position 25 is a video image receiver 40 such as, for example, a charge coupled device (CCD).

The light source 26 is controlled by power source 30 and trigger source 31 which in turn is controlled by the personal computer 41 controller. In other embodiments multiple ones of light source 26 can be used.

Each of the power sources 28,30 are configured so as to adjust the intensity of the respective light source 24,26 through a multiplicity of intensities from a minimum value, such as "just on", to a maximum value, such as "full-on".

A line 32 is the signal path for images recovered by the video image receiver 40 being returned to the personal computer 41 for image processing.

Figure 4:
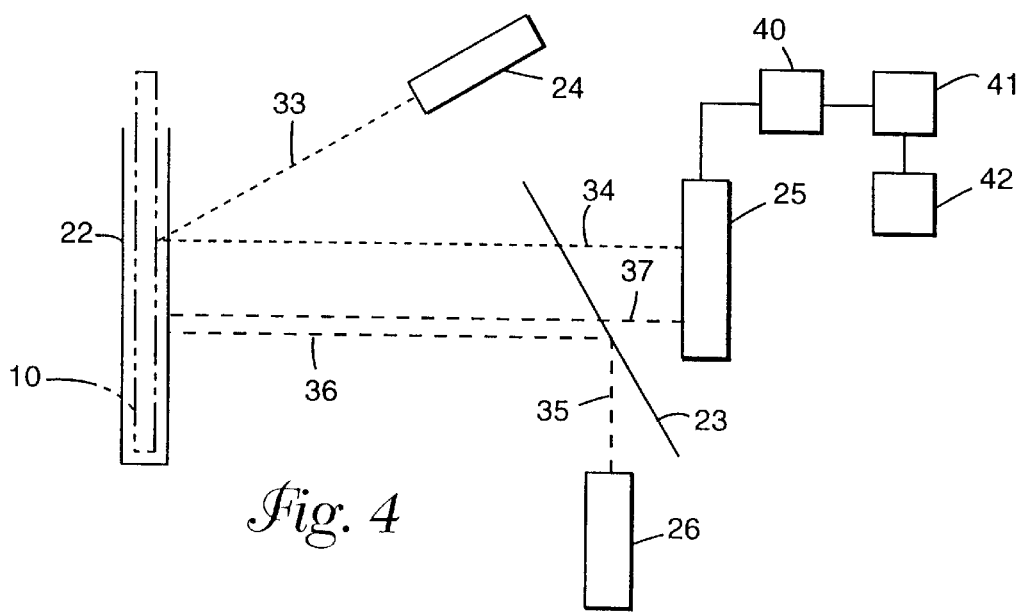
FIG. 4 illustrates the light paths of the arrangement of FIG. 3.

FIG. 4 illustrates the light paths within the preferred embodiment of FIG. 3. The object document 10 is being examined for both content and security integrity.

The light source 24, relative to the viewing position of the video image receiver 40, is at an angle greater than 1° when emitted light path 33 is measured against a return beam 34. When the light source 24 is illuminated, the beam 33 penetrates the microsphere structure of the document 10 and reflects from the substrate 11 and source image 12 beneath.

The video image receiver 40 can therefore "look through" the laminate 13.

When the light source 26 is illuminated, a beam of light 35, is redirected as a beam 36, towards the document 10, due to the properties of beam splitting mirror 23.

The beam 36 is then reflected as a beam 37 by the surface of the microsphere structure of the document 10 being at an angle of less than 1°. In this case the light source 26 does not appear to penetrate the microsphere structure but instead can be said to "look at" the microsphere structure of the laminate.

The characteristics of document 10 can be detected by the video image receiver 40 and passed on for analysis by the personal computer 41 dependent on which of the light sources 24 or 26 is illuminated. In a mode where the source image 12 contained on the document 10 needs to be passed to the computer 41, the computer controlled light source 24 is illuminated.

In a mode where the minute details of the structure of the microspheres of the laminate 13 need to be passed on to the computer 41, then computer controlled light source 24 is extinguished and light source 26 is illuminated.

As an alternative to alternately switching light sources 24 and 26, the beams of light 33 and 35 can be filtered to include light only of a limited or predetermined wavelength or polarity. In such a situation, both light sources 24 and 26 can be enabled simultaneously and appropriate computer software is used to process and resolve a dual image created thereby.

Images processed and produced by the computer 41 can be displayed for examination on a video display unit 42 associated therewith.

Through external processing it is possible to identify that a retroreflective laminate exists, or that a plain polyester laminate exists, or that neither exist.

It is a pre-condition of the following explanation that in the previous step of recovering visual data from the document and decoding that data into computer compatible codes, it is revealed as to which type of laminate is supposed to be protecting said document. This is achieved through a "reference" or "look-up" table in such an external device as assigning "this style of laminate to this series of protected document", e.g., Australian passports contain a retroreflective laminate, British passports contain a polyester laminate, etc. These pre-conditions and external controls can be programmed into the personal computer 41.

If external control determines that a retroreflective laminate should be present, light sources 24 and 26 are illuminated at minimum intensity. If a retroreflective laminate is present a visual response will be detected over the entire viewing area of the video image receiver 40.

If no laminate is present there will be insufficient light intensity to illuminate the source image 12 and the video image receiver will see no visual response.

If a polyester film or similar laminate is present the mirrored image will be in the form of a distorted flairing in the center of the video image area roughly equal to the image of the light source.

When external control determines that a retroreflective laminate exists, light sources 24 and 26 are excited to illuminate to mid brilliance where the microsphere structure reflects a much brighter signal which makes it possible to distinguish the background bead signal from any hidden source image contained in the microsphere structure. Control within the computer 41 then attempts to pattern match this hidden source image against a pattern that has been stored as part of the reference for the item being examined.

In order to examine for microsphere structure damage, the light sources 24 and 26 are illuminated to full brilliance where any damage is identifiable as a dark area against the intact microsphere structure. The computer 41 is configured to apply a brightness threshold across the video image in order to reveal the dark areas.

If external control determines that a polyester laminate should be present, the light source 26 is illuminated to a minimum brilliance. A distorted image of the light source will be seen by the video image receiver as a distorted bright flair in roughly the center of the image area. This pattern is stored. The light source 26 is then increased in intensity progressively. If the image of the flairing is seen to grow in area in the correct proportion to the original image then the light source is "looking at itself in the mirror" and confirmation is given that polyester laminate exists.

To examine for surface cuts, a further light source 50 is aimed at the surface of the document 10, 89° away from the axis of the light source 26. This is achieved by creating a beam of light 51 that is focused across the surface of the document 10, in either the horizontal or vertical plane depending on the orientation of the document 10. The focused light 51 is reflected from the document 10 back through the mirror 23 and is detected by the image receiver 40. Cuts will show up as flairs in the surface of the laminate that were not detected under light source 24.

If external control indicates that no laminate is or should be present, the light source 26 is illuminated to full brilliance and the image gathered is compared to the image seen by the light source 24. If they are identical then there is no laminate present.

To check for the presence of ultra-violet or infra-red responses, as determined by the "reference" or "look-up" tables, under external control a corresponding light source is illuminated and the video image receiver 40 should detect a specific color response at a specific x/y coordinate, which is resolvable by the computer 41.

The presence of patterned diffraction gratings, sometimes referred to as "kinegrams", and of holographic embossings, can also be revealed through the activation of the aforementioned light sources. In these cases the gratings reveal their position and shape as being a difference in the color responses as revealed by two differently angled light sources. Computer analysis can compare the responses to provide a determination of the presence or otherwise of holographs or embossings.

The foregoing describes only a number of embodiments of the present invention and modifications, obvious to those skilled in the art, can be made thereto without departing from the scope of the present invention.

I claim:

1. An arrangement for reading information from a first light transmissive layer and a second layer of an object, said arrangement comprising:
    a first light source for directing first light at a first angle of incidence at the object;
    a second light source for directing second light at a second angle of incidence, different to said first angle of incidence, at the object;
    a light receiver for receiving a reflection of said first light from said first layer, and a reflection of said second light from said second layer and to produce at least one image signal; and
    a processor for processing said image signal to provide information regarding said layers.

2. An arrangement as claimed in claim 1, wherein the first layer comprises a plurality of microspheres having optical properties similar to glass.

3. An arrangement as claimed in claim 1, wherein the first layer comprises a material having optical properties similar to polyester.

4. An arrangement as claimed in claim 1, further comprising a two-way mirror for directing the first light to said object, and arranged so that the first light having been reflected by the first layer passes through the two-way mirror for detection by the light receiver.

5. An arrangement as claimed in claim 1 wherein the processor is a data processing unit such as a personal computer.

6. An arrangement as claimed in claim 1 wherein the first and second light sources are switchable so as to operate alternately or simultaneously.

7. An arrangement as claimed in claim 1 wherein each of the first and second light sources are individually intensity controlled.

8. An arrangement as claimed in claim 1 wherein the first and second light sources produce light at different bandwidths, or different wavelengths, or both.

9. An arrangement as claimed in claim 8 wherein said light is selected from the group consisting of ultra-violet light and infra-red light.

10. An arrangement as claimed in claim 1 wherein the light receiver comprises a video image receiver, such as for example, a charged coupled device.

11. An arrangement as claimed in claim 2, wherein the first layer is a sheet of plastic material having said microspheres applied thereto.

12. An arrangement as claimed in claim 1, wherein said second layer is a document located below the first layer, said document comprising a source image.

13. An arrangement as claimed in claim 12, wherein said document comprises a substrate upon which said source image is formed, said substrate and said source image having different light reflective properties.

14. An arrangement as claimed in claim 12, wherein said document is selected from the group consisting of a passport, an identity card, a land title, and a share title.

15. An arrangement as claimed in claim 1, wherein an angle of reflection of said first light relative to the position of the light receiver is greater than 1°.

16. An arrangement as claimed in claim 1, wherein an angle of reflection of said second light relative to the position of the light receiver is less than 1°.

17. An arrangement as claimed in claim 1, wherein said processing device compares said image signal with at least one predetermined image to provide said information.

18. An arrangement as claimed in claim 1, wherein said image signal represents a combination of said first light and said second light.

19. An arrangement as claimed in claim 1, wherein said first light and said second light produce corresponding ones of said light from a predetermined one of said layer or said source image;
    detecting said reflected light at at least one viewing location to provide a detected image; and
    processing said image to resolve information regarding said source image or said layer or both.

20. An arrangement as claimed in claim 1, further comprising a third light source for directing third light at a third angle of incidence, at least substantially normal to said first light, at said object, said third light being focused in a plane across a surface of said object.

21. An arrangement as claimed in claim 1, wherein said image signal comprises a first image signal derived from illumination of said first light source, and a second image signal derived from said second light source, and said processing comprises comparing the first image signal with the second image signal to determine a color difference response, said response being indicative of a patterned diffraction grating or a holographic embossment formed in or on said object.

22. A method for examining an object having a source image and an overlying light transmissive layer, said method comprising the step of directing light at a plurality of different angles of incidence at said layer, said angles being selected to cause reflection of said image signal.

23. A method for examining an object having a source image and an overlying light transmissive layer, said method comprising the steps of:
    (a) directing light at at least one angle of incidence at said layer to cause reflection of light from said layer; and
    (b) detecting said reflected light at a plurality of viewing locations to provide plural resolve information regarding said source image or said layer or both.

* * * * *

UNITED STATES PATENT AND TRADEMARK OFFICE
CERTIFICATE OF CORRECTION

| | |
|---|---|
| PATENT NO. | : 6,019,287 |
| DATED | : February 1, 2000 |
| INVENTOR(S) | : Graeme R. Mann |

It is certified that error appears in the above-identified patent and that said Letters Patent is hereby corrected as shown below:

<u>Column 4,</u>
Lines 55-59, this paragraph should be placed before the paragraph starting at column 4, line 48.

Signed and Sealed this

Sixteenth Day of October, 2001

Attest:

NICHOLAS P. GODICI
*Attesting Officer*  *Acting Director of the United States Patent and Trademark Office*